United States Patent [19]

Mahl, Jr. et al.

[11] 4,076,773
[45] Feb. 28, 1978

[54] PROCESS FOR PRILLING AMMONIUM NITRATE

[75] Inventors: Harry L. Mahl, Jr.; Franklin D. Clark, both of Wilmington, N.C.

[73] Assignee: W. R. Grace & Co., New York, N.Y.

[21] Appl. No.: 668,013

[22] Filed: Mar. 18, 1976

Related U.S. Application Data

[63] Continuation of Ser. No. 526,702, Nov. 25, 1974, abandoned.

[51] Int. Cl.² .............................................. C06B 21/00
[52] U.S. Cl. ..................................... 264/3 E; 264/14; 264/37
[58] Field of Search ................ 264/3 R, 3 C, 3 E, 13, 264/14, 37, 82; 149/46

[56] References Cited

U.S. PATENT DOCUMENTS

| 3,388,014 | 6/1968 | Russo | 264/3 R |
| 3,930,911 | 1/1976 | Clark | 149/46 |
| 3,966,853 | 6/1976 | Osako et al. | 264/13 |

FOREIGN PATENT DOCUMENTS

1,208,850  10/1970  United Kingdom.

OTHER PUBLICATIONS

Brandner et al., Vapor Pressure of Ammonium Nitrate, Jour. of Chem. & Eng. Data, vol. 7, No. 2, Apr. 1962, pp. 127 & 128.

*Primary Examiner*—Peter A. Nelson
*Attorney, Agent, or Firm*—Elton Fisher

[57] ABSTRACT

This invention comprises an improvement in a method for preparing ammonium nitrate prills wherein molten ammonium nitrate is prilled in a prill tower in the presence of cooling gas containing a predetermined amount of ammonia to retard thermal dissociation of the ammonium nitrate, thereby to decrease formation of extremely small aerosol particles of ammonium nitrate; the improvement comprises: (a) withdrawing cooling gas from an upper portion of the prill tower; (b) cooling and dehumidifying the withdrawn gas; and (c) recycling the cooled and dehumidified gas to a lower portion of the prill tower.

2 Claims, 4 Drawing Figures

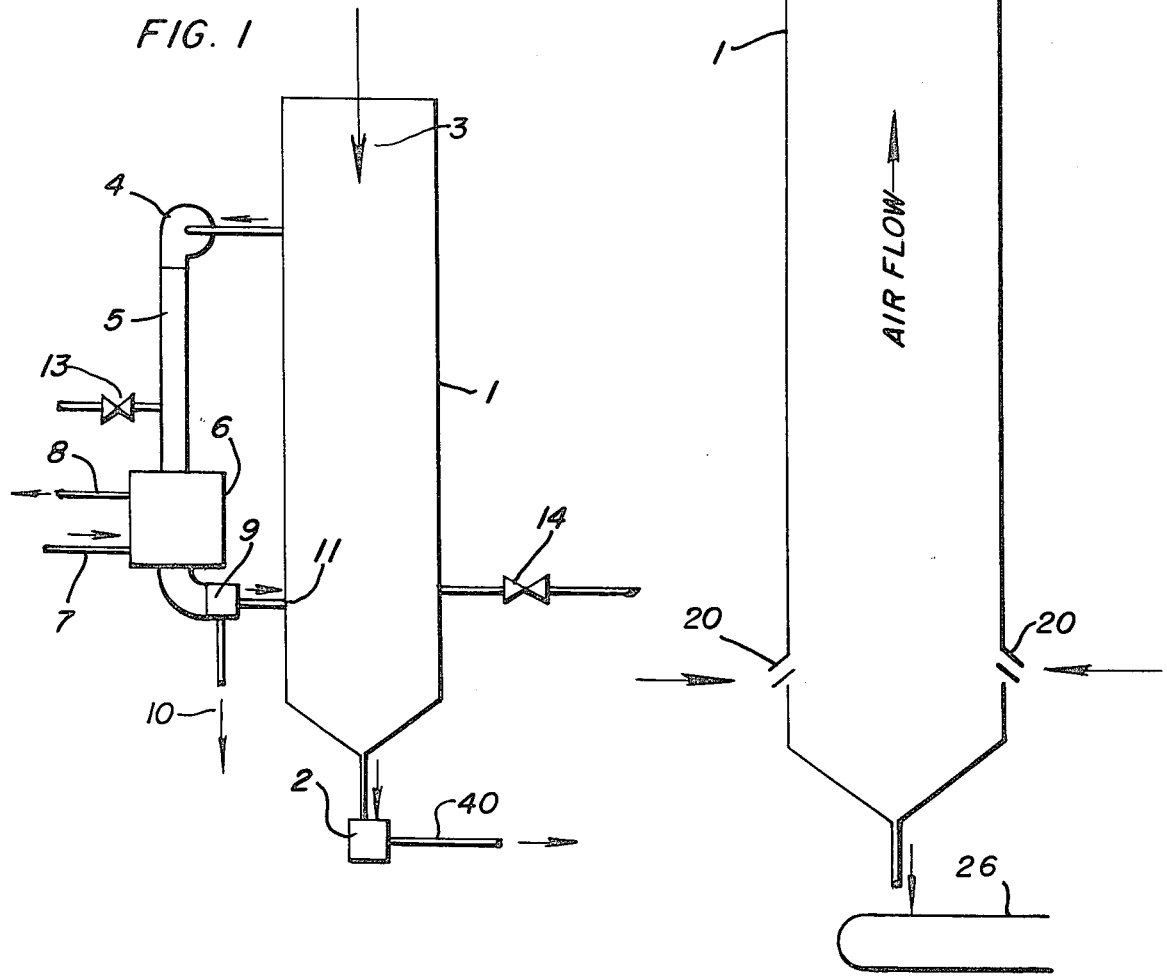

PROCESS FOR PRILLING AMMONIUM NITRATE

CROSS REFERENCE TO RELATED APPLICATION

This is a continuation of application Ser. No. 526,702, filed Nov. 25, 1974, and now abandoned.

BACKGROUND OF THE INVENTION

This invention relates to the production of prilled ammonium nitrate. In this process ammonium nitrate is sprayed or injected in a flowable molten state into a stream of cooling gas, such as air, either cocurrently or countercurrently for the purpose of solidifying the droplets into small solid particles. This invention more specifically relates to preventing formation of extremely fine solid particles which are emitted with the cooling gas stream and which can pollute the surrounding environment and result in substantial product losses.

The principle of prilling or shotting molten fluids into spherical or spheroidal shapes by allowing droplets to solidify while falling is well known. Many adaptations have been used successfully to employ the surface tension effect of the molten drop and gravity to produce substantially spherical, free flowing and non-agglomerated salt particles. Most of the methods commercially used employ a mechanical device to disperse the molten salt into a cooling chamber where the molten droplets fall and cool until fusion occurs. The hot particles may cool further as they fall, depending on the height of the cooling chamber. The cooling chamber may vary in size and shape depending on the salt composition. Spray dryers and prill towers are examples of various shapes common to the art. The prilling process has become commercially widespread in recent years as a method for making small spheroidal particles from various salts and mixtures. Prilling of ammonium nitrate was first described by Williams et al in U.S. Pat. No. 2,402,196.

When ammonium nitrate is prilled, the molten salt usually contains from 0.10% to 5% water, by weight. A relatively dry melt, i.e., 99.9% ammonium nitrate, results in a dense prill, whereas a wetter melt, i.e., 95% ammonium nitrate, produces a lower density prill. Since the object of prill towers is to solidify the liquid droplets after a spherical shape has formed, the ammonium nitrate melt must enter the prill tower at a temperature above the melting point. This temperature may range from 125° to 200° C, depending upon the solution concentration and the particular operating characteristics of the prill tower.

Prilling technique has also been employed to granulate salt mixtures and slurries. For example, ammonium nitrate and limestone blends are prilled for the production of a fertilizer material commonly called nitrochalk, nitrolime or ammonium nitrate-limestone. This composition usually contains 55–60 wt% $NH_4NO_3$ and about 40–45% limestone.

Although some prill towers use cocurrent flow, most commercial ammonium nitrate prilling plants use ambient air flowing upward countercurrent against the downward flow of prills. Natural draft, and forced or induced fans and blowers, are used to obtain a flow of air. The prill tower air stream has several purposes. The ammonium nitrate droplet must be free falling in the air in order to form a sphere. In addition, the air must remove both sensible heat and the heat of fusion (crystallization) of the ammonium nitrate, and the air stream may provide some drying of the ammonium nitrate particles. Prill towers are operated commercially on a once-through basis, i.e., the air is vented after passing through the prill tower. In practice, the use of ambient air makes the prilling technique subject to weather variations, often to the detriment of the operation and product.

The prill tower air stream vent has been given considerable attention as a prime source of air pollution since both government and industry have become aware of the environmental effects of particulate emissions. The prill towers vent air containing water vapor and ammonium nitrate dust (usually in submircon size) which is visible as a plume from the prill tower. In view of the possible pollution resulting from such prilling operations, effort has been expended toward reducing or eliminating the level of the emission. Most proposals have involved scrubbing or filtering systems to cleanse the air being vented. Since the emission particles are in the sub-micron range, great difficulty is encountered in their recovery.

Considerable research over recent years has documented the instability of ammonium nitrate. Cawthorn and Taylor have reported in "Kinetics of the Thermal Decomposition of Ammonium Nitrate", Report Control No. OSR-TN-54-334, U.S. Department of Commerce, Office of Technical Services, that ammonium nitrate thermally decomposes as a function of time, temperature and concentration. Dissociation and ionization of ammonium nitrate are known to vary with temperature according to the reactions:

$$NH_4NO_3 \rightleftharpoons NH_3 + HNO_3$$

$$NH_4NO_3 \rightleftharpoons NH_4^+ + NO_3^-$$

Prill tower emissions originate largely as a result of these chemical reactions. In the molten state 95% to 99.9% ammonium nitrate tends to dissociate at the point of introduction into the prill tower. Reassociation, or neutralization, occurs rapidly in the air stream forming a chemical smoke of submicron ammonium nitrate particles. The rate of particulate formation or aerosol emission is therefore a function of temperature and it has been found that the emission rate will increase as the prilling temperature increases.

SUMMARY OF THE INVENTION

It has been discovered that the rate of aerosol emission can be controlled by prilling ammonium nitrate or ammonium nitrate containing salt mixtures in a cooling gas containing at least 150 ppm free ammonia. Although the chemical mechanism is not completely understood, it is believed that the presence of small quantities of gaseous ammonia prevents or retards the dissociation of ammonium nitrate by influencing the equilibrium of dissociation, thereby avoiding recombination of the dissociation products in the gaseous phase and subsequent formation of a chemical smoke.

It has also been discovered that the concentration of ammonia in the prill tower air to achieve total abatement of visible emissions depends upon the temperature of the molten ammonium nitrate as it is introduced into the cooling gas. The ammonia-laden air must be present substantially at the point at which the ammonium nitrate enters into the prill tower in order to completely prevent dissociation.

Accordingly, it is an object of this invention to provide a novel prilling process. Another object is to provide a new process for producing granular ammonium nitrate in a prill tower wherein a molten concentrated feedstream comprising ammonium nitrate and containing not more than 5 wt% water is prilled in contact with an ammonia-laden cooling gas to form spheroidal granules, to retard thermal dissociation of the ammonium nitrate, and to decrease formation of aerosol particles of extremely small size. Yet another object is the obtainment of total abatement of visible particulate emission, by adding the ammonia by gaseous injection into a prill tower in amount sufficient to maintain a concentration of about 150 ppm to 1% by weight in the gaseous phase. In another aspect of the invention at least 0.25 wt% free ammonia is added to the molten feestream.

These and other objects and advantages of the invention will be seen in the following description and in the drawing.

THE DRAWING

FIG. 1 is a schematic representation of a vertical prill tower with recycled cooling gas;

FIG. 2 is a similar schematic drawing of a vented prill tower;

DESCRIPTION

Figure 4:
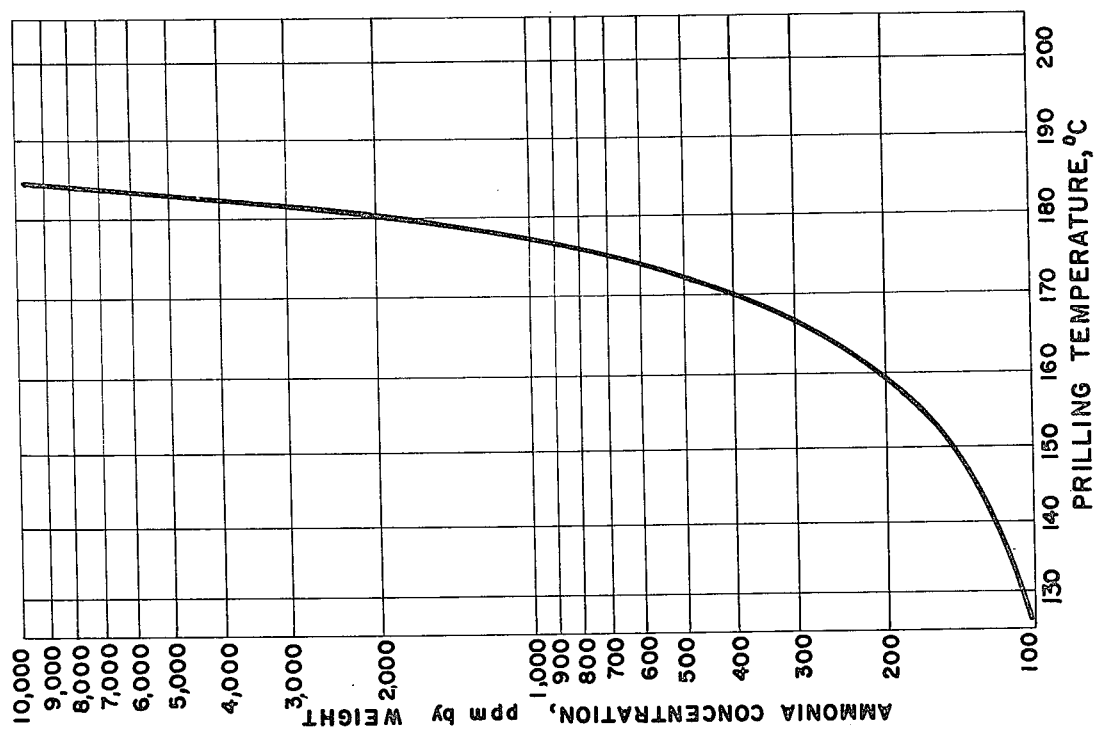
FIG. 4 is a similar graphic plot of ammonia concentration required for total abatement at various prilling temperatures.

All measures used herein are parts by weight and in metric units unless otherwise specified.

The reaction of ammonia with nitric acid and pretreatment of the reaction product to obtain a concentrated molten ammonium nitrate stream is well known. Typical prior art preparation methods and apparatus are described in U.S. Pat. Nos. 2,402,192, 2,739,036, 2,934,412, 3,232,703 and 3,351,454, incorporated herin by reference. Various salt compositions consisting essentially of pure 95 to 99.9% $NH_4NO_3$ or mixtures with limestone are described for prill manufacture. The particles are useful as fertilizers or as an explosive component. The stoichiometric mixture of ammonia and nitric acid is usually brought to pH 5—6. It is known to add minute quantities of free ammonia to the molten feedstream to provide denser prills.

The examples given herein were obtained by operation of a full scale prill tower having about 30 meters of free fall in an air cooling chamber with about 40 $m^2$ of cross-sectional area. The prills are formed by flowing the molten salt through a gridwork of holes about 650 $\mu$ in diameter. Ambient air at about 20° to 30° C was employed as the cooling gas at a rate of about 75—150 $+ 10^3 m^3$/hour. Other methods for introducing the melt are described in U.S. Pat. Nos. 2,979,764, 3,249,657 and 3,274,642.

The embodiments of this invention can be fully utilized in any manner of mechanical processes common to the art of manufacturing ammonium nitrate prills or pellets. Since the primary intent is to prevent air pollution emissions from prilling equipment, it is preferred to recycle and reuse the ammonia-laden air stream in the prill tower and thereby eliminate both an ammonium nitrate emission and an ammonia vapor effluent, as illustrated in FIG. 1. A total recycle of air permits the prill tower to be operated with a controlled ammonia concentration without atmospheric contamination. Further, the system is closed and affords the additional advantage of eliminating any solids emission due to pneumatic forces on smaller particulate such as fine prills or fragments. A further advantage to this invention is that the prilling operation is not subjected to the variations of weather because the air stream is pretreated during the recycle.

In FIG. 1 air flows upward through the prill tower 1 against a downward falling stream of ammonium nitrate. The ammonium nitrate cools, solidifies and further cools until the prills are collected and exit from the bottom 2 via mechanical device 40, preferably a belt conveyor or star type conveyor that is substantially sealed against air leaks. The molten ammonium nitrate is sprayed into the prill tower through conventional spraying devices 3 at the top of prill tower 1 which is also sealed against air leaks. The molten feedstream is usually controlled at a prilling temperature about 5° to 25° C above the crystallization temperature of the melt. The air exits the prill tower through blower 4 and flows through duct 5 into cooler 6.

The air gains heat in the prill tower due to the heat of fusion and sensible heat loss of the ammonium nitrate. This heat gain will increase the air temperature from 3° to 25° C as it passes through the prill tower, depending upon the relative size of the prill tower corresponding to the volume of recycled air. The air is cooled to a temperature of 20° to 35° C, depending upon the size and design of the cooler and the temperature of the cooling water which enters at inlet 7 and exits at outlet 8 in FIG. 1. The air then passes through a demister apparatus 9 to remove any condensate 10 formed in cooler 6. When prilling ammonium nitrate concentrations of around 95% by weight, some drying can occur in the prill tower and this moisture removal must be accompanied by an equivalent removal of condensate from demister 9. Leaving the demister 9, the air re-enters at the bottom 11 of the prill tower. If a relatively wet melt (e.g., approximately 95% ammonium nitrate and 5% water) is prilled, the air entering the prill tower at 11 will be saturated, i.e., 100% relative humidity. This humid air at the bottom of the tower has little or no deleterious effect on the prill, although the air humidity is well above the critical humidity of the hydroscopic ammonium nitrate prill leaving the tower, because the air relative humidity will decrease with temperature increase as the air passes through the tower, and because the contact time between relatively wet air and dry prill is only a fraction of a second. If high density prills are produced with ammonium nitrate concentration of approximately 99.9% in the melt, no condensation is encountered in cooler 6 and demister 9 may be eliminated.

The cooling and condensation of the moistue in the recycling air also serves to purge any ammonium nitrate particulate matter which may be present in the air stream due to entrainment or inadequate control of temperature and ammonia concentration. The soluble ammonium nitrate salt will combine with the condensate 10 to form a weak solution which is collected on the demister 9 and drained from the system. In cases where operating at high concentration (e.g., 99.9%) or at a temperature such that fusion occurs rapidly with little or no drying within the prill tower, there may be insufficient condensate to dissolve the ammonium nitrate carryover. In such cases the injection of small amounts of low pressure steam through steam valve 13 into the recycle air stream between the exit blower 4 and cooler 6 may be used to provide the necessary condensate source for dissolving and purging any ammonium nitrate particulate present in the recycled air.

An air sample is withdrawn intermittently or continuously and analyzed for ammonia concentration. The ammonia concentration in the recycle air should be greater than that shown on FIG. 4 for any corresponding prilling temperature. Periodic concentration adjustment can be achieved by injecting gaseous or liquid anhydrous ammonia into the system at any convenient location in the air recycle equipment, or directly into the prill tower through valve 14 as shown on FIG. 1.

EXAMPLE 1

Figure 3:
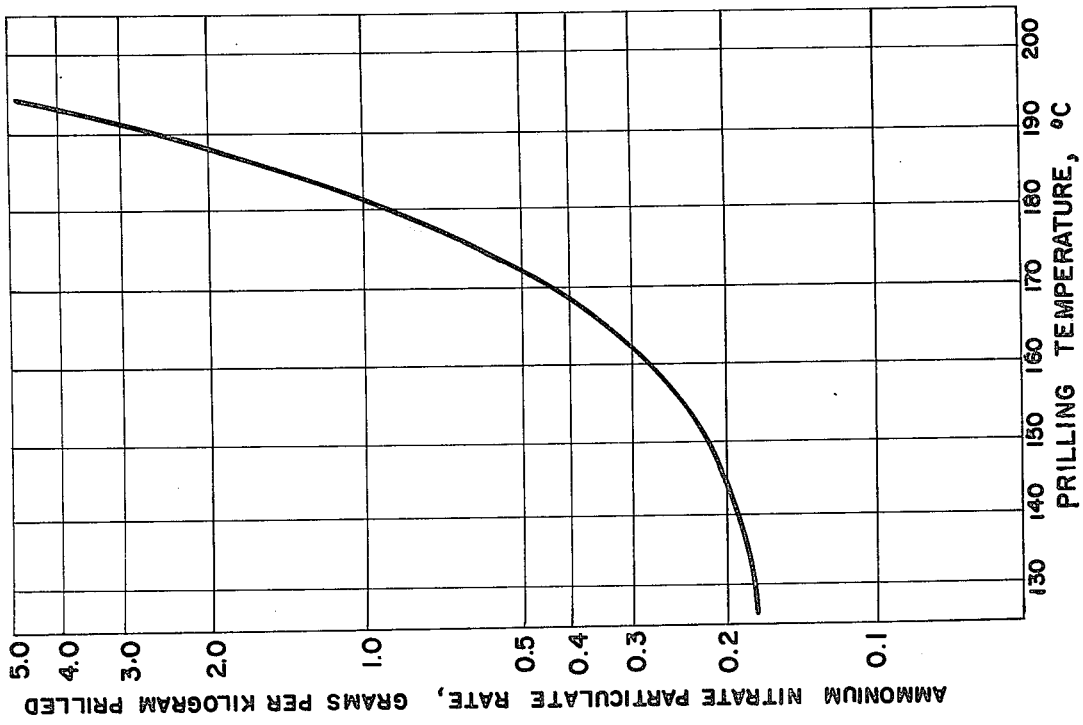
FIG. 3 is a graphic plot of particulate emission rate per unit of prill production at various prilling temperatures.

Using a test prilling apparatus illustrated in FIG. 2, vessel or chamber 1 is a prill tower with ambient air inlet ports 20 and air exits through either a cross-sectional area grate 21 or blowers 22. Material to be prilled enters through heater 23 and head tank 24 to spraying devices 3. The prills are removed on a conveyor 26 at the bottom of the tower. A sampler tip with a filter 27 was connected to a positive displacement suction pump 28 which has a by-pass valve 29 and rotameter 30 to permit control of the sample intake in order to maintain isokinetic sampling. Samples were taken at various positions around the grate 21 while the temperature leaving the heater 23 was varied from 140° to 180° C and while blowers 22 were shut down in order to permit a natural draft of air to flow upward through prill tower 1 and grate 21. The tests were tried while prilling both ammonium nitrate and an ammonium nitrate and limestone slurry. In every case only ammonium nitrate was found in the emission collected on filter 27, ranging from 0.2 to 1 gram of emission per kg of prills as illustrated in FIG. 3.

While the cooling gas employed in ammonium nitrate prilling is usually air, other inert cooling gases may be used, especially in a closed loop system.

EXAMPLE 2

Using the same test prilling apparatus illustrated in FIG. 2, a concentrate containing 96.2% ammonium nitrate, 0.26% free ammonia and 3.54% water was prilled at 170° C leaving spraying devices 3. About 70% of the free ammonia was released into the atmosphere at grate 21, and an obvious visual reduction of the chemical plume of ammonium nitrate aerosol was noted. Prilling with varying degrees of visible plume reduction was also accomplished with 95% ammonium nitrate while prilling at a temperature in the range of 140° to 150° C and with 0.15 wt% free ammonia based on $NH_4NO_3$ in the molten ammonium nitrate feedstream.

EXAMPLE 3

A sample of prill tower effluent containing a dense aerosol of ammonium nitrate smoke was taken from the prill tower via blower 22 in FIG. 2 and passed through a large mixing chamber equipped with baffles. Gaseous anhydrous ammonia was injected into the effluent sample at varying rates until the concentration of ammonia in the sample reached 500 ppm by weight. The ammonia had no effect on the particulate density of the previously formed plume, thus confirming that the ammonia-laden atmosphere must be present during prill formation to prevent the chemical reactions which occur at the introduction of the hot melt into the prill tower.

EXAMPLE 4

Using the same test prilling apparatus illustrated in FIG. 2, varying amounts of gaseous ammonia were injected into the prill tower 1 at the air inlets 20. Immediate and total disappearance of the ammonium nitrate emission was achieved. The concentration of ammonia was measured at grate 21 while varying the prilling temperature at heater 23 and the rate of ammonia introduction at inlets 20. The tests were made while prilling: (a) a molten concentrate of 95 wt% $NH_4NO_3$ (up to 170° C; a slurry of approximately 60% $NH_4NO_3$ and 40% ground limestone (above 170° C). A threshold or minimum concentration of ammonia in the air was obtained for total visual plume abatement, corresponding to various prilling temperatures as illustrated in FIG. 4.

The presence of free ammonia in the atmosphere may be obtained by several methods. An excess of free ammonia may be introduced directly into the ammonium nitrate melt. Such excess free ammonia is then liberated at the point of introduction of the molten salt into the prill tower, thereby providing an atmosphere suitable for the control of the chemical smoke formation. Excess free ammonia in the ammonium nitrate melt in concentration greater than 0.25% by weight based on weight of melt achieves partial control. Total abatement of the emission may not be achieved by ammonia in the melt even at the lowest operable prilling temperature. Partial reduction of the emission is possible, however, by introducing the excess free ammonia into the molten ammonium nitrate stream before prilling. Once the dissociation of ammonium nitrate occurs, the reassociation into an aerosol of ammonium nitrate cannot be effectively controlled or prevented.

The preferred method for obtaining an ammonium-laden atmosphere is by direct injection of gaseous ammonia into the prill tower or into the air stream at the base of the tower. The concentration of free ammonia in the gaseous phase should exceed 150 ppm (parts per million) by weight for complete abatement of the particulate emission due to dissociation of the ammonium nitrate at the low temperature of 140° C. Referring to FIG. 4, the threshold or minimum concentration required for total disappearance of the emission will increase with temperature and must exceed 1% by weight for prilling temperatures corresponding to commercial prilling operations using concentrated ammonium nitrate for production of high density prills. The concentration of ammonia should exceed the curve value shown on FIG. 4; a lesser ammonia concentration will result in only partial reduction of the aerosol emission.

While this invention has been described by particular examples, there is no intent to limit the inventive concept except as set forth in the following claims.

What is claimed is:

1. In a process for producing granular ammonium nitrate comprising feeding molten ammonium nitrate containing not more than 5 wt% water into a prill tower containing a cooling gase to form spheroidal granules while maintaining ammonia gas in the cooling gas to retard thermal dissociation of the ammonium nitrate and to decrease formation of aerosol particles of ammonium nitrate, the concentration of ammonia gas in the cooling gas being at least as great as shown in the concentration-temperature curve of FIG. 4, with prilling temperature within the corresponding FIG. 4 values for said respective concentrations, the improvement comprising;

a. withdrawing cooling gas from an upper portion of the prill tower;
b. cooling and dehumidifying the withdrawn gas; and
c. recycling the cooled and dehumidified gas to a lower portion of the prill tower.

2. In a process for prilling a salt mixture containing ammonium nitrate and not more than 5 wt% water comprising feeding the salt mixture as a molten feedstream into a prill tower containing a cooling gas to form speroidal granules while maintaining ammonia gas in the cooling gas to retard thermal dissociation of the ammonium nitrate and to decrease formation of aerosol particles of ammonium nitrate, the concentration of ammonia gas in the cooling gas being at least as great as shown in the concentration-temperature curve of FIG. 4, with prilling temperature within the corresponding FIG. 4 values for said respective concentrations, the improvement comprising:

a. withdrawing cooling gas from an upper portion of the prill tower;
b. cooling and dehumidifying the withdrawn gas; and
c. recycling the cooled and dehumidified gas to a lower portion of the prill tower.

* * * * *